United States Patent [19]

Horiguchi et al.

[11] 3,846,452

[45] Nov. 5, 1974

[54] CARBOXYL-PHTHALEINS

[75] Inventors: Shojiro Horiguchi, Tokyo; Michiei Nakamura, Soka; Keiji Nakajima, Urawa; Minoru Takizawa, Tokyo, all of Japan

[73] Assignee: Dainichiseika Color & Chemicals Mfg. Co., Ltd., Tokyo, Japan

[22] Filed: June 28, 1972

[21] Appl. No.: 267,079

[30] Foreign Application Priority Data
June 28, 1971   Japan.............................. 46-46288

[52] U.S. Cl.............................. 260/343.4, 252/408
[51] Int. Cl.............................................. C07d 5/06
[58] Field of Search................................. 260/343.4

[56] References Cited
UNITED STATES PATENTS

| | | | |
|---|---|---|---|
| 627,981 | 7/1899 | Classen............................ | 260/343.4 |
| 1,922,240 | 8/1933 | Harris et al...................... | 260/343.4 |
| 2,933,507 | 4/1960 | Hodes.............................. | 260/343.4 |

*Primary Examiner*—Donald G. Daus
*Assistant Examiner*—Anne Marie T. Tighe
*Attorney, Agent, or Firm*—Oblon, Fisher, Spivak, McClelland & Maier

[57]     ABSTRACT

A pH indicator having a sharp, easily detectable color change in the 7 – 9 pH range is prepared by condensing a 2,5-dialkylphenol with a trimellitic acid anhydride in the presence of a Friedel-Crafts reaction catalyst.

2 Claims, No Drawings

CARBOXYL-PHTHALEINS

BACKGROUND OF THE INVENTION

1. Field of the Invention

This invention relates to a process for preparing a novel pH indicator, and more particularly to a process for preparing a novel carboxyl group containing alkylphenolphthalein type pH indicator.

2. Description of the Prior Art

Heretofore, it has been known that such conventional pH indicators as sulfonphthalein type Thymol Blue, Paraxylenol Blue and the like, will provide a color indication in the acidic pH range of 7– 9 and will appear blue in the alkaline pH range. However, the color in the acidic pH range is yellow, so that the color in the color change pH range is a yellowish-green or a bluish-green, which is a somewhat difficult indication to observe with any high degree of precision.

Phthalein type Thymolphthalein changes color from colorless to blue, but since the color change occurs at pH 9.3, it is unsatisfactory for titrations requiring color indication within the 7 – 9 pH range.

SUMMARY OF THE INVENTION

Accordingly, it is one object of this invention to provide a color pH indicator which can be used for measuring pH changes in the 7 – 9 pH range.

It is another object of this invention to provide a color pH indicator which experiences a color change reaction in the 7 – 9 pH range which undergoes more distinct and more easily observable color change.

These and other objects have now been attained by the discovery that a compound prepared by the condensation reactions of a 2,5-dialkylphenol with a trimellitic acid anhydride in the presence of a Friedel-Crafts reaction catalyst will undergo a blue ⇌ colorless color reaction from alkaline conditions to an acidic condition within the 7 – 9 pH range.

DETAILED DESCRIPTION OF THE INVENTION

The chemical structure of the color indicator compound of this invention is not completely known. However, it is believed to have the structure of either

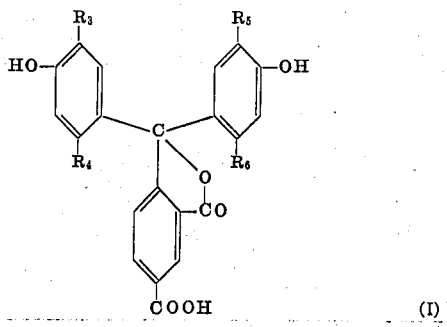

(I)

or

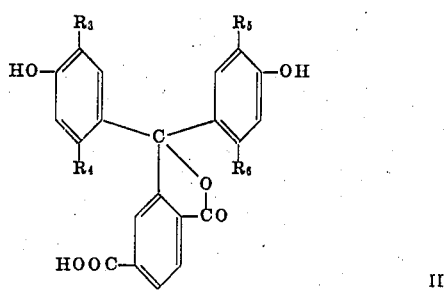

II wherein $R_3$, $R_4$, $R_5$ and $R_6$ each represent lower alkyl groups, preferably methyl, ethyl or propyl.

This compound can be halogenated by conventional processes to provide a pH indicator which is believed to have the formula of either

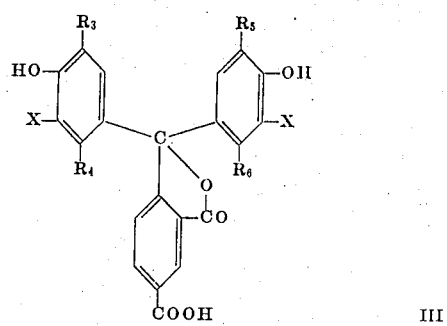

III

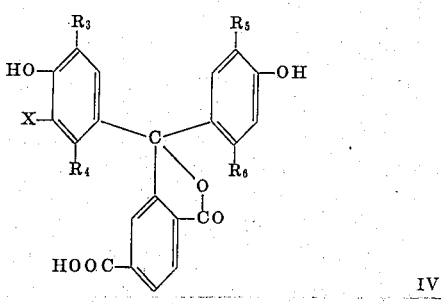

IV wherein X represents a halogen such as chlorine, bromine or iodine and $R_3$, $R_4$ and $R_5$ are as defined above.

In preparing these compounds, a 2,5-dialkylphenol of the formula:

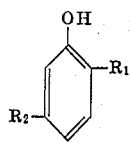

wherein $R_1$ and $R_2$ are each lower alkyl groups, particularly methyl, ethyl or propyl, is condensed with a trimellitic acid anhydride in the presence of a Friedel-Crafts reaction catalyst. Suitable 2,5-dialkylphenols useable herein include 2,5-xylenol (2,5-dimethylphenol) and thymol (2-isopropyl-5-methylphenol) etc. Suitable Friedel-Crafts reaction catalysts which can be used include anhydrous stannic chloride, anhydrous titanium chloride, anhydrous zinc chloride and anhydrous ferric chloride, etc. In carrying out the condensation reaction, more than 2 moles of 2,5-dialkylphenol is reacted with more than 1 mole of the Friedel-Crafts reaction catalyst per mole of trimellitic acid anhydride in the reaction. Preferably 2 – 3 moles of 2,5-dialkylphenol is condensed in the presence of 1 – 5 moles of the Friedel-Crafts reaction catalyst per 1 mole of trimellitic acid anhydride.

The reaction can be carried out under molten conditions, or in solution, but molten conditions are preferred in order to decrease the quantity of by-product production. When the reaction is carried out in solution, a solvent which is inert to the Friedel-Crafts reaction catalyst should be used. Suitable solvents include benzene, nitrobenzene, trichlorobenzene, carbon bisulfide, ligroin and carbon tetrachloride. It is especially preferable to use solution conditions but to use an excess quantity of 2,5-dialkylphenol which will function both as reactant and as solvent.

Halogenation can be carried out by conventional chlorination, bromination or iodination techniques.

The carboxy group containing alkylphenolphthalein, prepared by the process of this invention, is colorless in the acidic pH range and is blue in the alkaline pH range. The indication point is at about 8.8 pH.

When thymol (carboxyl) phthalein prepared by condensing thymol with trimellitic acid anhydride, is compared with thymolphthalein, prepared by condensing thymol with phthalic acid anhydride, the pH indication point for the carboxy derivatives was found to be 0.5 lower than that of thymolphthalein.

The carboxy containing halogenated alkylphenolphthalein, prepared by the process of this invention, is colorless in the acidic pH range and is blue in the alkaline pH range. The indication point is at about 7.8 pH.

For comparison, when the bromothymol (carboxyl) phthalein is compared with thymolphthalein, it is found that the pH indication point for the bromothymol (carboxy) phthalein is 1.5 pH lower than that of thymolphthalein.

The pH indicator prepared by this invention has an acidic color change pH range limit of pH 7 – 9. Accordingly, it can be utilized as a neutralization titration indicator which can be usefully employed as a pH indicator color component for the color change detergent composition shown in the Japanese Pat. Publication No. 14636/1967.

Having now generally described the invention, a further understanding can be attained by reference to certain specific Examples which are provided herein for purposes of illustration only and are not intended to be limiting unless otherwise specified. All parts and percents are shown by weight.

EXAMPLE 1

Into a reactor equipped with a stirrer and a reflux condenser, closed to prevent the introduction of moisture from air, 38.2 parts of trimellitic acid anhydride, 80 parts of thymol and 52 parts of anhydrous stannic chloride were introduced. The mixture was heated to 95°C. for 30 minutes and was stirred at this temperature for 4 hours to effect condensation.

After removing unreacted thymol, the reaction mixture was dissolved in 520 parts of a 5 percent sodium hydroxide aqueous solution and was filtered. The pH of the filtrate was adjusted to pH 3 – 4, to effect precipitation of the condensation product. The product was filtered, washed with water and dried.

The product was recrystallized from an acetone-toluene solvent mixture to yield 46 parts of thymol (carboxyl) phthalein, having a melting point of 247° – 249°C. and an acidic color change pH range limit of 8.8 – 9.5. The color change reaction was from blue in the alkaline pH range to colorless in the acidic pH range.

EXAMPLE 2

Into a reactor equipped with a stirrer and a reflux condenser, closed to prevent the introduction of moisture from the air, 19 parts of trimellitic acid anhydride, 30 parts of thymol, 40 parts of anhydrous titanium tetrachloride and 70 parts of nitrobenzene as a solvent were introduced. The mixture was heated to 95°C. for 30 minutes and was condensed at 90° – 100°C. for 6 hours. After removing unreacted thymol and nitrobenzene, the reaction mixture was dissolved in 1,000 parts of 5 percent sodium hydroxide aqueous solution.

In accordance with the process of Example 1, the solution was filtered, precipitated, filtered again, washed with water, dried and recrystallized, to yield 24 parts of thymol (carboxyl) phthalein, which has a melting point of 246° – 249°C. and an acidic color change pH range limit of 8.8 – 9.5 and colorless in the acidic pH range and blue in the alkaline pH range.

EXAMPLE 3

In accordance with the process of Example 2, 19 parts of trimellitic acid anhydride, 30 parts of thymol, 16.2 parts of anhydrous ferric chloride and 50 parts of nitrobenzene were introduced. After the condensation reaction, the product was purified to yield 14 parts of thymol (carboxyl) phthalein which had a melting point of 246°–248°C. The color change pH range and color change was the same as in Example 2.

EXAMPLE 4

In accordance with the process of Example 1, 38.2 parts of trimellitic acid anhydride, 65 parts of 2,5-xylenol and 52 parts of anhydrous stannic chloride were charged to the reactor. After the condensation reaction, the product was purified to yield 42 parts of 2,5-xylenol (carboxyl) phthalein, which had a melting point of 272°–274°C., and a color change pH range of 8.8 – 9.5. It was colorless in the acidic pH range and blue in the alkaline range.

EXAMPLE 5

In accordance with the process of Example 2, 19 parts of trimellitic acid anhydride, 24.4 parts of 2,5-xylenol and 40 parts of anhydrous titanium tetrachloride and 70 parts of nitrobenzene were charged to the reactor. After the condensation reaction, the product was purified to yield 21 parts of 2,5-xylenol (carboxyl) phthalein, which had a melting point of 273° – 275°C. The color change pH range and the color change was the same as in Example 4.

EXAMPLE 6

In accordance with the process of Example 1, 19.2 parts of trimellitic acid anhydride, 18 parts of thymol, 14.7 parts of 2,5-xylenol and 26 parts of anhydrous stannic chloride were charged to the reactor. After the condensation reaction, the product was purified to yield 15.4 parts of thymol-2,5-xylenol (carboxyl) phthalein (presumed), which had a color change pH range of 8.8 – 9.5. It was colorless in the acidic pH range and blue in the alkaline pH range.

EXAMPLE 7

Into a reactor equipped with a stirrer, reflux condenser and dropping funnel, 50 parts of thymol (carboxyl) phthalein prepared as in Example 1, and 119 parts of ethyl alcohol, were charged, and were completely dissolved. 50.3 parts of bromine was added, dropwise, at 25°C. over 30 minutes from a dropping funnel into the solution. The mixture was then reacted for 1.5 hours. The reaction mixture was poured into 2,000 parts of water to precipitate the product. The product was filtered, washed with water and dried to yield 63 parts of dibromothymol (carboxyl) phthalein, which had a color change pH range of 7.8 – 9.0 and was colorless in the acidic pH range and was blue in the alkaline pH range.

EXAMPLE 8

Into a reactor equipped with a stirrer, a reflux condenser and dropping funnel, 7.0 parts of 2,5-xylenol (carboxyl) phthalein and 50 parts of ethyl alcohol were charged, and were completely dissolved at 60°C. A solution of 5.3 parts of bromine in 20 parts of ethyl alcohol was added, dropwise, over 30 minutes to the solution, and then the mixture was reacted at 60°C. for 1 hour. The reaction mixture was poured into 500 parts of water to precipitate the product, which was filtered, washed with water and dried to yield 8.8 parts of dibromo xylenol (carboxyl) phthalein, which had a color change pH range of 7.8 – 9.0 and was colorless in the acidic pH range and blue in the alkaline pH range.

EXAMPLE 9

In accordance with the process of Example 8, 44.6 parts of the product prepared as in Example 6, which seems to be thymol-2,5-xylenol (carboxyl) phthalein, and 149 parts of ethyl alcohol was charged and were dissolved. A solution of 48 parts of bromine in 200 parts of ethyl alcohol was added, dropwise, to the solution for 30 minutes, and then the mixture was reacted at 60°C. for 1 hour. The product was precipitated in water, and was filtered, washed with water and dried to yield 59.8 parts of monobromo-thymol-monobromo-2,5-xylenol (carboxyl) phthalein (presumed), which had a color change pH range of 7.8 – 9.0 and was blue in the alkaline pH range.

Having now fully described the invention, it will be apparent to one of ordinary skill in the art that many changes and modifications can be made thereto without departing from the spirit or scope of the invention as set forth herein. ACCORDINGLY,

What is claimed and intended to be covered by Letters Patent is:

1. A pH indicator having the formula:

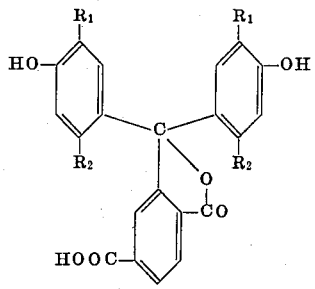

or

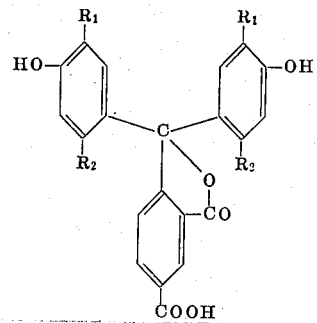

wherein $R_1$ and $R_2$ each represent methyl, ethyl, or propyl.

2. A pH indicator having the formula:

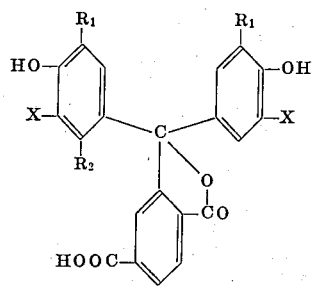

or

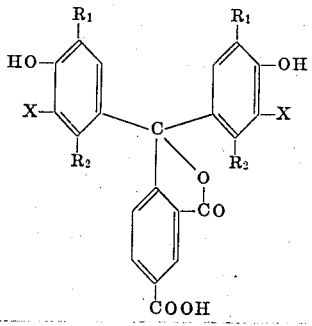

wherein $R_1$ and $R_2$ each represent methyl, ethyl, or propyl and X represents a chlorine, bromine, or iodine.

* * * * *